United States Patent [19]
Paradis

[11] 4,143,759
[45] Mar. 13, 1979

[54] POSITIONABLE CLEATS AND ASSOCIATED CONVEYORS

[76] Inventor: Joseph R. Paradis, 225 Cochituate Rd., Wayland, Mass. 01778

[21] Appl. No.: 786,056

[22] Filed: Apr. 8, 1977

Related U.S. Application Data

[63] Continuation of Ser. No. 656,577, Feb. 9, 1976, abandoned.

[51] Int. Cl.² ............................................. B65G 15/42
[52] U.S. Cl. .................................... 198/688; 198/699
[58] Field of Search ............... 198/472, 648, 698, 699, 198/711, 712, 731, 733, 850–852, 844, 688; 226/92

[56] References Cited
U.S. PATENT DOCUMENTS 3,842,968  10/1974  Owens .................................. 198/851

Primary Examiner—Joseph E. Valenza
Attorney, Agent, or Firm—George E. Kersey

[57] ABSTRACT

Cleats which may be positioned as desired on a conveyor belt. Each cleat has ears which permit its temporary and alterable attachment to a belt with alternating ridges and channels that are transverse to the direction of movement of the belt.

9 Claims, 6 Drawing Figures

U.S. Patent  Mar. 13, 1979  Sheet 1 of 3  4,143,759
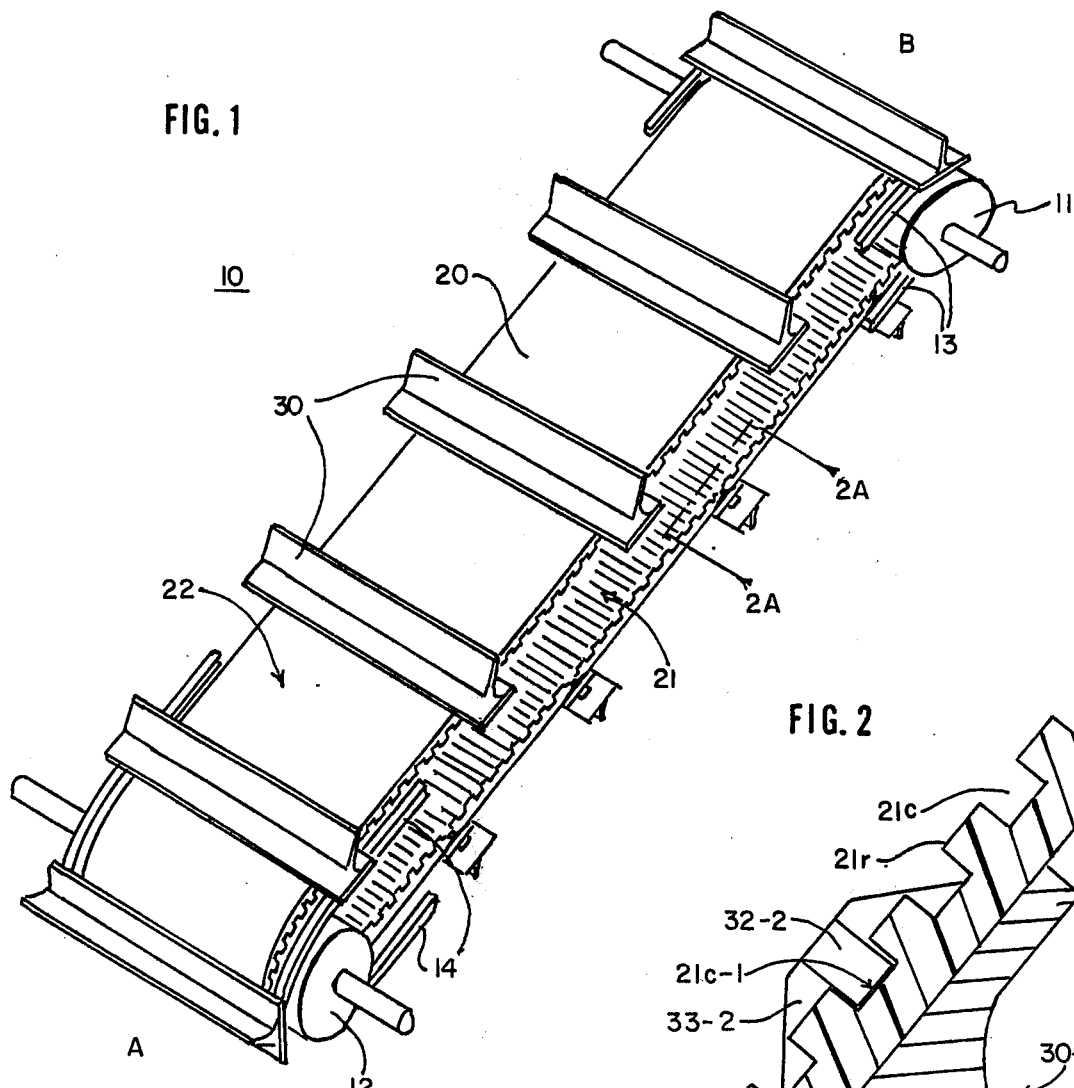
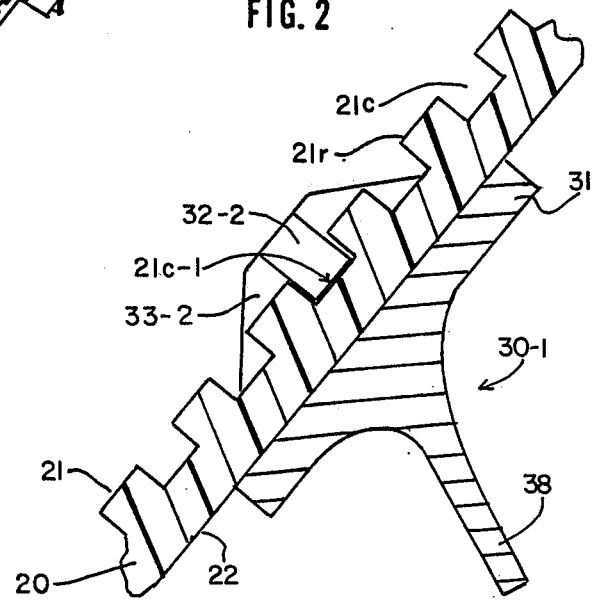

POSITIONABLE CLEATS AND ASSOCIATED CONVEYORS

This is a continuation of Ser. No. 656,577 filed Feb. 9, 1976, now abandoned.

BACKGROUND OF THE INVENTION

This invention relates to positionable cleats and associated conveyors, and more particularly to positionable cleats and conveyors for items such as parts.

Conveyors are used in the movement of items, such as parts, from one processing station to another. For example parts which are ejected from a mold are conveyed to machines which segregate and separate the parts according to type. The conveyor may take the form of an elevator to raise the parts from one level to another, or it may merely move the parts horizontally from one location to another.

In order to assure that the parts will be spaced properly and to assure conveyance in the case of an elevator conveyor, it is customary for the conveyor to have periodically positioned cleats. The nature and spacing of the cleats depends upon the type of part being conveyed.

The typical conveyor has permanently fixed cleats, so that when a change in parts is made, by a change in mold, for example, it is necessary to change the conveyor. While there are conveyors with interlocked parts that permit a change in cleating, the conveyors are complex, the parts are difficult to change and the conveyors are comparatively expensive.

Accordingly, it is an object of the invention to realize a conveyor system which can accommodate a wide variety of items. A related object is to achieve a conveyor system for different kinds of parts.

Another object of the invention is to realize positionable cleats for conveyors which do not require complex components and are easily changed in accordance with the item to be conveyed. A related object is to achieve positionable linkage which are relatively inexpensive to produce, to install and to operate.

A further object of the invention is to realize a conveyor which is able to accommodate positionable cleats without the need for complex linkages and interlocks. A related object is to realize a relatively inexpensive and easily installed and operated conveyor with positionable cleats.

SUMMARY OF THE INVENTION

In accomplishing the foregoing and related objects, the invention provides a conveyor cleat that is configured to be temporarily secured to a conveyor belt. The latter includes periodic recesses for temporarily receiving cleats at various positions along its length.

In accordance with one aspect of the invention the cleat has projections which are received in oppositely positioned recesses of the belt.

In accordance with another aspect of the invention the recesses for the cleats are formed by regularly positioned channels, on one side of the belt, extending in a direction transverse to the usual direction of motion of the belt.

In accordance with yet another aspect of the invention the cleats are removed using a screwdriver-like device to pry the belt away from the cleat at the projections.

In accordance with a further aspect of the invention each cleat includes a longitudinal groove which extends in the direction of the length of the belt to position a tool which bows the belt to facilitate installation of the cleat.

In accordance with still another aspect of the invention the cleat projections have recesses to accommodate side guides which stabilize the conveyor during the traverse of curved paths.

DESCRIPTION OF THE DRAWINGS

Other aspects of the invention will become apparent after considering several illustrative embodiments, taken in conjunction with the drawings, in which:

FIG. 1 is a perspective view of an elevator conveyor with positionable cleats in accordance with the invention;

FIG. 2 is a sectional view of a portion of the conveyor of FIG. 1;

DETAILED DESCRIPTION

Figure 3A:
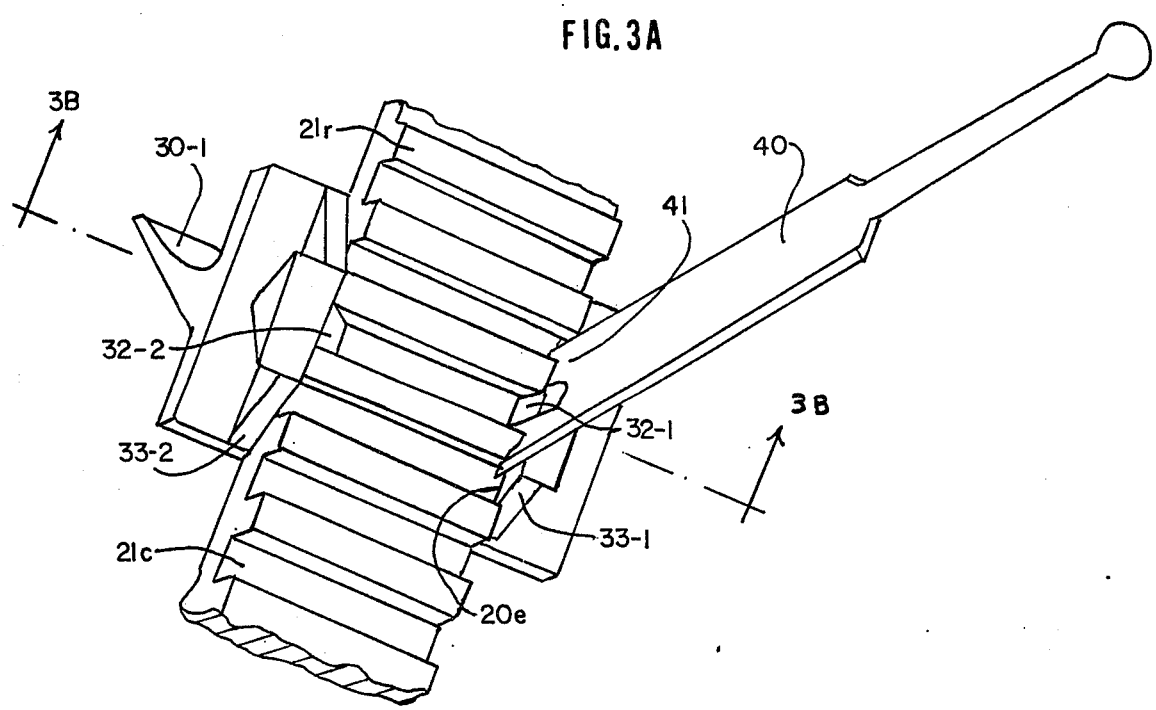
FIG. 3A is an enlarged perspective view of a portion of the conveyor of FIG. 1, illustrating removal of a cleat in accordance with the invention.

Turning to the drawings, FIG. 1 shows a conveyor 10 in accordance with the invention for use in elevating items, such as molded parts from a first position A to an elevated position B. It will be understood that the conveyor 10 is merely illustrative and that the invention may be used in all types of conveyors, including those that operate horizontally and vertically.

The conveyor 10 of FIG. 1 is formed by a belt 20 with removable and positionable cleats 30. The belt 20 extends around upper and lower pulleys 11 and 12. At the pulley positions guides 13 and 14 are included to contact the cleats 30 and stabilize them as the belt travels around the pulleys. It will be understood that the guides 13 and 14 may be used in other regions of belt travel for additional stability.

As can be seen in FIGS. 1 and 2, the belt 20 has a ribbed inner surface 21 and a smooth outer surface 22. In the particular form of belt depicted in FIG. 2, the inner surface 21 is formed by alternating channels 21c and ridges 21r. Such a belt can be of the type commonly known as a "timing belt", which is used primarily with engines and is readily and widely available.

The cleat 30-1 shown in FIG. 2 is formed by a base member 31 which mounts supports 33-1 and 2 for projections 32-1 and 2 (of which only the supports 33-2 and the projection 32-2 are visible in the cross-sectional view of FIG. 2). The projections 32-1 and 2 engage a channel 21c-1 near opposite edges of the belt 20. The base member 31 also mounts an angular flange 38 that engages the items to be conveyed and extends from a side of the base member 31 that is opposite to that for the supports 33-1 and 2.

Since the belt 20 has periodic channels 21c, the cleat 30 is easily moved to another position, or replaced entirely.

To change the cleat 30-1 its projections are disengaged from the channel 21c-1. This is readily accomplished, as shown in the partial perspective view of FIG. 3A by the use of a screwdriver-like tool 40 with a split blade 41 inserted between the edge 20e of the belt 20 and the inside wall of a mounting 33-1 for the cleat projection 32-1.

Figure 3B:
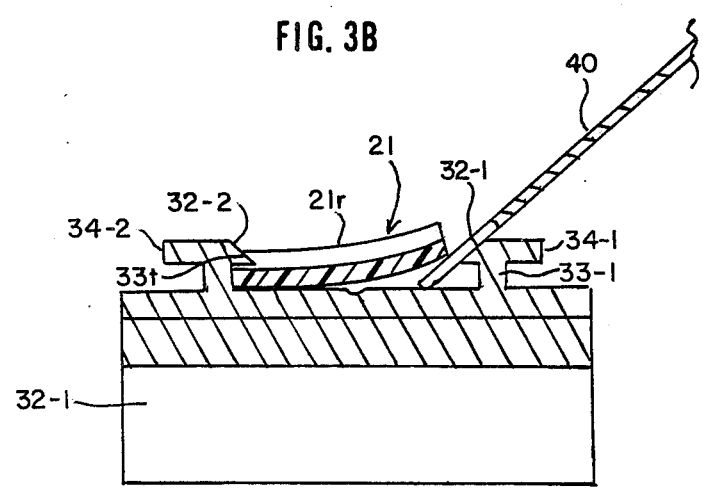
FIG. 3B is a cross section of the conveyor fragment shown in FIG. 3A.

As indicated in the cross-sectional view of FIG. 3B, the belt is easily pried from the projection 32-1 and freed from the cleat 30-1. The cleat may then be moved to another position or replaced with a different kind of cleat.

Figure 4A:
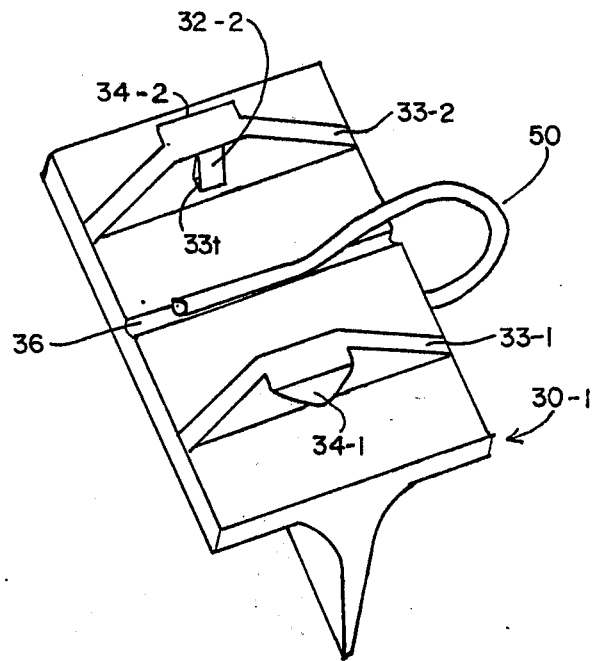
FIG. 4A is a perspective view of a cleat in accordance with the invention being used with a special tool to facilitate installation on a belt.
Figure 4B:
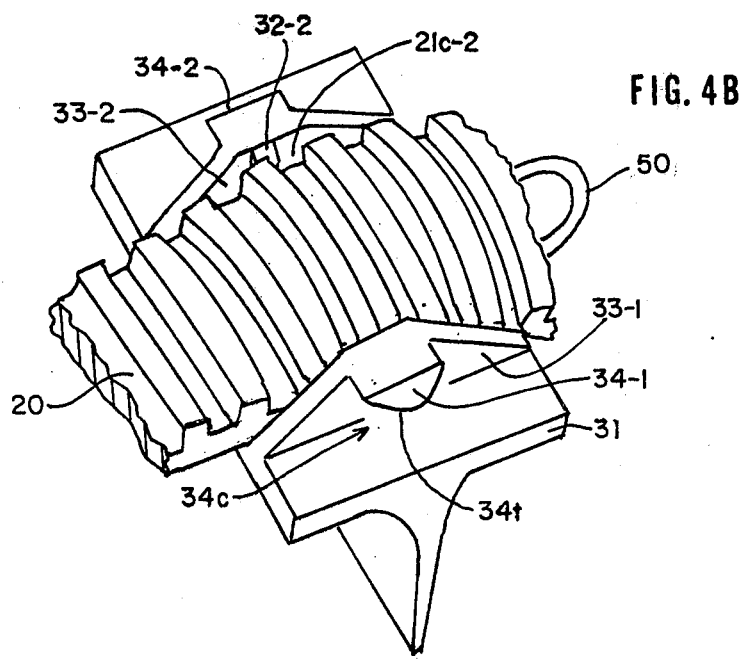
FIG. 4B is a partial perspective view of the cleat of FIG. 4A being installed on a belt in accordance with the invention.

To reposition the cleat 30-1 a special tool 50 is used as shown in FIG. 4A. The tool 50 is a spring clip that fits on one side into a longitudinal groove 36. Consequently, as pictured in FIG. 4B, one edge of the belt 20 is brought against the support 33-2, with the projection 32-2 in a new channel 21c-2, the belt 20 is bowed by virtue of the tool 50 and the other side is easily slipped over the opposite projection 32-1; its upper surface has a taper 33t indicated in FIGS. 3B and 4A.

In addition, as can be seen in FIGS. 3B and 4A, the supports 33-1 and 33-2 have lateral extensions 34-1 and 34-2 which provide a channel 34c between the projections 34 and the base member 31 for the guides 13 and 14 (FIG. 1).

The projections 34-1 and 34-2 have a tapered edge 34t (facing the base member 31) to facilitate travel of the cleats along the guides 13 and 14 along a curved path.

It will be apparent that the tool 50 can be used to expedite the removal of a cleat by inserting it into the groove 36 before the tool 40 is used. It will also be apparent that cleats in accordance with the invention can be made to exceed the width of the belt 20 to any degree desired.

While various aspects of the invention have been set forth by the drawings and the specification, it is to be understood that the foregoing detailed description is for illustration only and that various changes in parts, as well as the substitution of equivalent constituents for thos shown and described may be made without departing from the spirit and scope of the invention as set forth in the appended claims.

What is claimed is:

1. In combination, a positionable conveyor cleat and a conveyor belt having recesses on the underside thereof;
   said cleat having a flight formed by a rigid single-piece member with securing means;
   said securing means comprising oppositely positioned members having inwardly directed abutments formed thereon securing said flight in at least one recess of said belt;
   whereby the flight can be removed and repositioned only by deflecting said belt.

2. A combination in accordance with claim 1 wherein said abutments are tapered to facilitate the installation of the cleat on the conveyor belt.

3. A combination in accordance with claim 1 wherein said flight has a base member which includes means for facilitating the disposition of the cleat with respect to the conveyor belt.

4. A combination in accordance with claim 3 wherein the facilitating means comprises a longitudinal groove for positioning a tool that bows the conveyor belt along its direction of travel during either installation or removal of the cleat.

5. A combination in accordance with claim 1 further including means for engaging said guides to stabilize the conveyor belt.

6. A combination in accordance with claim 5 wherein the engaging means comprise recesses in said flight.

7. A combination in accordance with claim 6 wherein said recesses form channels that are tapered with respect to said flight.

8. A combination in accordance with claim 1 secured to said belt wherein said belt has alternating ridges and channels which are transverse to its direction of travel and said cleat engages said belt in one of said channels.

9. A combination in accordance with claim 8 wherein said belt has a cross section with a substantially square-wave pattern on one surface thereof.

* * * * *